United States Patent
Fujieda et al.

(10) Patent No.: US 9,827,694 B2
(45) Date of Patent: Nov. 28, 2017

(54) MOLD HEATING DEVICE

(75) Inventors: Yasuhiko Fujieda, Takasago (JP);
Masatake Toshima, Kobe (JP);
Yuuichirou Mizuta, Takasago (JP)

(73) Assignee: Kobe Steel, Ltd., Kobe-shi (JP)

(*) Notice: Subject to any disclaimer, the term of this patent is extended or adjusted under 35 U.S.C. 154(b) by 1441 days.

(21) Appl. No.: 13/376,477

(22) PCT Filed: Jun. 28, 2010

(86) PCT No.: PCT/JP2010/004258
§ 371 (c)(1),
(2), (4) Date: Dec. 6, 2011

(87) PCT Pub. No.: WO2011/007509
PCT Pub. Date: Jan. 20, 2011

(65) Prior Publication Data
US 2012/0074133 A1 Mar. 29, 2012

(30) Foreign Application Priority Data
Jul. 16, 2009 (JP) ................................ 2009-167706

(51) Int. Cl.
*H05B 6/22* (2006.01)
*B29C 33/06* (2006.01)
(Continued)

(52) U.S. Cl.
CPC .......... *B29C 33/06* (2013.01); *B29C 35/0805* (2013.01); *B29D 30/0606* (2013.01);
(Continued)

(58) Field of Classification Search
CPC .......... H05B 6/10; B23K 13/01; B23K 1/002; B29D 30/0606; B29D 30/0654
(Continued)

(56) References Cited

U.S. PATENT DOCUMENTS 2,738,406 A * 3/1956 Zaleski ................. 219/745
3,294,606 A * 12/1966 Morgan et al. ............. 156/124
(Continued)

FOREIGN PATENT DOCUMENTS

CN 101511557 A 8/2009
EP 2 065 151 A1 6/2009
(Continued)

OTHER PUBLICATIONS

Machine translated: Okada, Kazuto; Heating Unit, Tire heater, and remodeling method of tire mold; May 1, 2008; JP2008-100,513A; total 31-page.*
(Continued)

*Primary Examiner* — Dana Ross
*Assistant Examiner* — Kuangyue Chen
(74) *Attorney, Agent, or Firm* — Oblon, McClelland, Maier & Neustadt, L.L.P.

(57) ABSTRACT

A mold heating device for heating a tire mold (M) for a green tire (T) includes an upper ring member (11) and a lower ring member (12) arranged so as to face one other in a specific direction with the space in which the tire mold (M) is disposed therebetween. A plurality of nonmagnetic members (13) are disposed at a plurality of positions aligned in the circumferential direction of the ring members (11, 12) with spaces therebetween so as to connect the upper ring member (11) and the lower ring member (12). Ferromagnetic non-conductive members (14) are provided on the inner surfaces of the nonmagnetic members (13), and a coil (15) is supported by the nonmagnetic members (13) with the ferromagnetic non-conductive members (14) therebetween so as to surround the space where the tire mold (M) is disposed from the outside in the direction perpendicular to the specific direction.

5 Claims, 6 Drawing Sheets

(51) Int. Cl.
*B29C 35/08* (2006.01)
*B29D 30/06* (2006.01)
*B29L 30/00* (2006.01)

(52) U.S. Cl.
CPC ............... *B29C 2035/0811* (2013.01); *B29C 2035/0816* (2013.01); *B29D 2030/0674* (2013.01); *B29D 2030/0677* (2013.01); *B29L 2030/00* (2013.01)

(58) Field of Classification Search
USPC .................... 219/602–617, 629, 635; 425/50
See application file for complete search history.

(56) References Cited

U.S. PATENT DOCUMENTS

| | | | |
|---|---|---|---|
| 4,599,061 A * | 7/1986 | Manabe et al. | 425/41 |
| 5,462,630 A | 10/1995 | Murakami | |
| 6,474,968 B1 * | 11/2002 | Mitamura et al. | 425/40 |
| 2005/0016995 A1 * | 1/2005 | Mitamura et al. | 219/635 |
| 2009/0308861 A1 * | 12/2009 | Okada et al. | 219/618 |

FOREIGN PATENT DOCUMENTS

| | | |
|---|---|---|
| JP | 59 114042 | 6/1984 |
| JP | 2001 158020 | 6/2001 |
| JP | 2005 271336 | 10/2005 |
| JP | 2008 100513 | 5/2008 |
| JP | 2008100513 A * | 5/2008 |
| KR | 10-2009-0020714 | 2/2009 |

OTHER PUBLICATIONS

Extended European Search Report dated Feb. 13, 2013 in Patent Application No. 10799573.0.

International Search Report dated Aug. 24, 2010 in PCT/JP10/04258 Filed Jun. 28, 2010.

Notice of Preliminary Rejection dated May 6, 2013 in Korean Patent Application No. 2012-7000968 (with English translation).

* cited by examiner

MOLD HEATING DEVICE

TECHNICAL FIELD

The present invention relates to a mold heating device for heating a tire mold that accommodates a tire.

BACKGROUND ART

As mold heating devices for heating a tire mold that accommodates a tire, devices described in FIG. 12 and FIG. 13 of a patent document 1 have conventionally been known.

The mold heating device shown in FIG. 12 of the patent document 1 includes a tubular heat shield arranged so as to surround a side surface of a tire mold that accommodates a tire, a tubular ferromagnetic non-conductive member fixed to an inner surface of the tubular heat shield, and induction heating coils fixed to an inner surface of the ferromagnetic non-conductive member. The heat shield is constructed by a non-metal material, a heat shield material, and a nonmagnetic metal material, which are successively laminated from its inner surface side.

The mold heating device described in FIG. 13 of the patent document 1 includes a tubular heat shield arranged so as to surround a side surface of a tire mold, induction heating coils fixed to an outer surface of the tubular heat shield, a tubular ferromagnetic non-conductive member fixed to outer surfaces of the induction heating coils, and a tubular nonmagnetic metal material fixed to an outer surface of the ferromagnetic non-conductive member. The heat shield is constructed by a non-metal material, and a heat shield material, which are successively laminated from its inner surface side.

For the devices shown in FIG. 12 and FIG. 13, it is not necessary to install the induction heating coils on the tire mold, and these devices are thus economical compared with devices, in which the induction heating coils are installed on the tire mold, such as shown in FIGS. 7 and 8 of the patent document 1, for example. Particularly since there are many types of tire molds, factories generally use much more tire molds than mold heating devices. If an induction heating coil is installed for each tire mold, the number of required induction heating coils increases. On the other hand, for the devices shown in FIG. 12 and FIG. 13 of the patent document 1, the number of required induction heating coils is efficiently reduced.

Moreover, in the devices shown in FIG. 12 and FIG. 13, the heat insulation material is arranged so as to cover the circumference of the tire mold, thereby restraining the heat from being emitted from the heated tire mold to the outside, and the energy consumption can thus be reduced.

However, the mold heating devices shown in FIG. 12 and FIG. 13 of the patent document 1 have the following problems during its production. For the device shown in FIG. 12, its assembly needs an operation of installing the induction heating coils on the inner surface of the heat shield, which includes the tubular non-metal material and nonmagnetic metal material, with the ferromagnetic non-conductive member disposed therebetween, and this operation is difficult. For the device, in which the induction heating coils are installed on the outer surface of the tubular heat shield as shown in FIG. 13, the heat shield has to support this induction heating coils, the ferromagnetic non-conductive member that is located outside the induction heating coils, and the nonmagnetic metal material that is located outside the ferromagnetic non-conductive member. Thus, high strength is necessary for the non-metal material that constructs the heat shield. However, it is difficult to manufacture heat shields constructed by a non-metal material, which is tubular-shaped and has high strength, such as a heat shield installed on the tire heating device, and the manufacture thereof accompanies a very high cost.

RELATED ART DOCUMENT

Patent Documents

[Patent Document 1] Japanese Patent Application Laid-open No. 2008-100513

SUMMARY OF THE INVENTION

The present invention has an object of providing a mold heating device for heating a tire mold, in which a tire is accommodated, which is inexpensive and easy to produce.

A mold heating device provided by the present invention includes: a pair of ring members opposing each other along a specific direction and across a space, in which a tire mold is disposed, and having ring-shape on planes perpendicular to the specific direction; a plurality of nonmagnetic members arranged at intervals at a plurality of positions arranged in the circumferential direction of the pair of ring members, and coupling both the ring members to each other; a ferromagnetic non-conductive member provided on the inside surface of each of these nonmagnetic members, the surface facing the tire mold; and a coil supported by the plurality of nonmagnetic members via the ferromagnetic non-conductive members so as to surround the space, in which the tire mold is disposed, from the outside of the direction perpendicular to the specific direction.

DESCRIPTION OF EMBODIMENTS

A description will now be given of an embodiment of the present invention referring to drawings.

Figure 1:
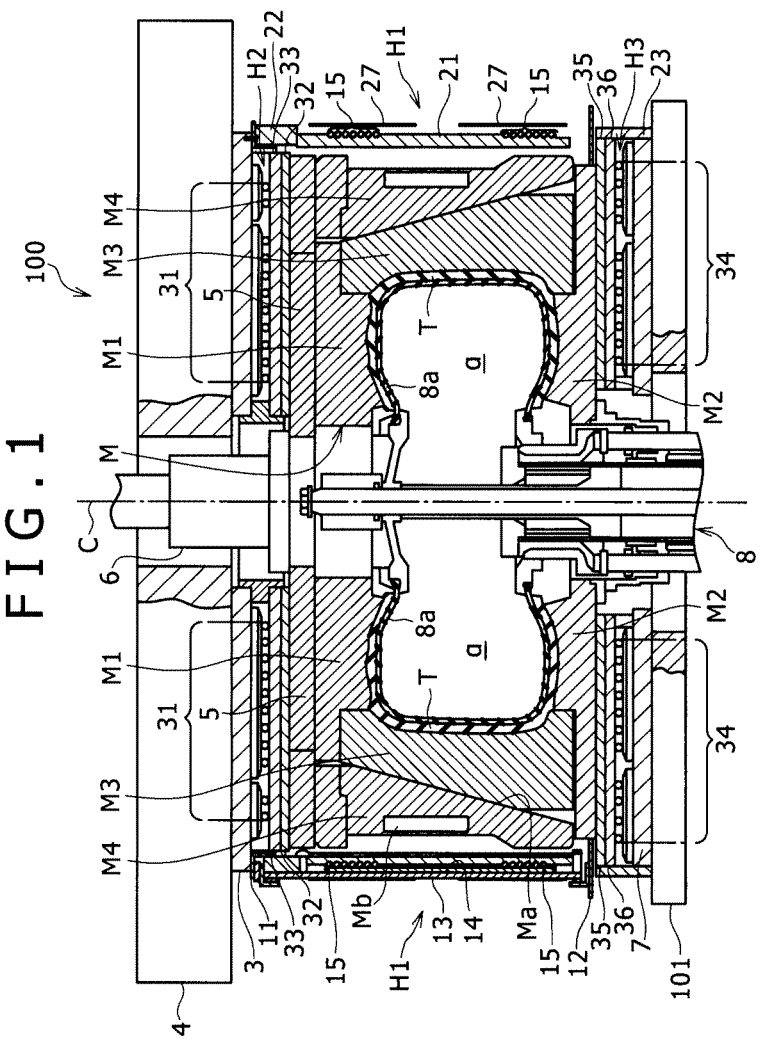
FIG. 1 is a cross sectional view of a tire heating device including a mold heating device according to an embodiment of the present invention and, which taken from line I-I in FIG. 3.
Figure 3:
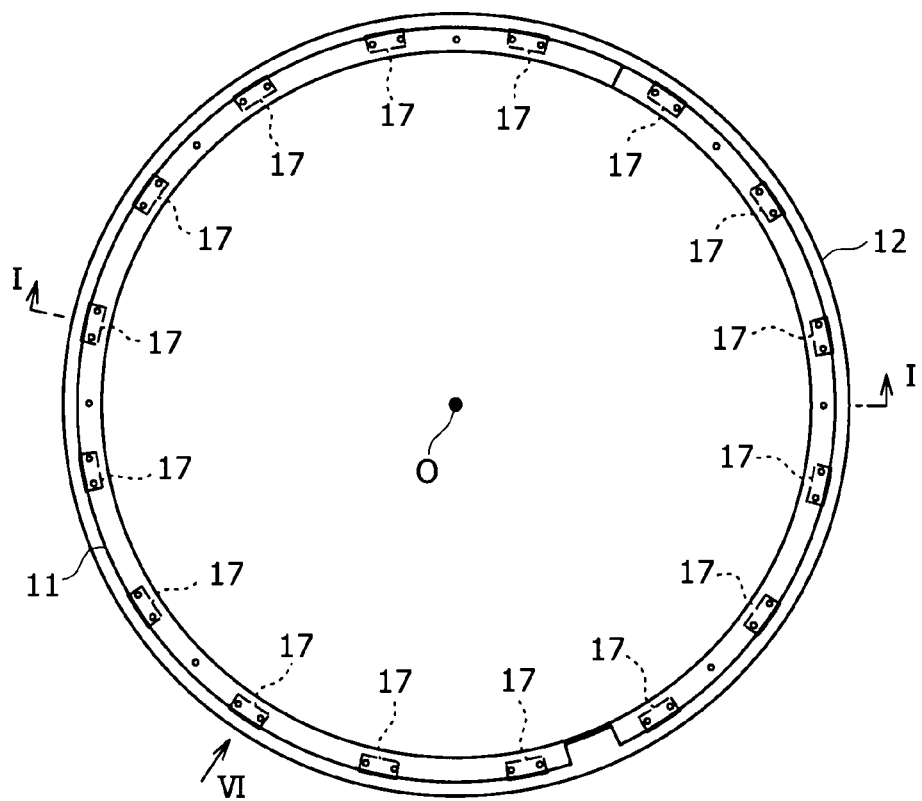
FIG. 3 is a plan view of the side-portion heating unit shown in FIG. 1.

FIG. 1 is a cross sectional view of a tire heating device 100 according to the present embodiment, which is taken from line I-I in a plan view of a side-portion heating unit shown in FIG. 3. However, hatching patterns indicating a cross section are omitted in a part in FIG. 1

As shown in FIG. 1, the tire heating device 100 is provided on a base plate 101. This tire heating device 100 includes an upper platen 3 in a plate shape, a lower platen 7 in a plate shape, a tire mold M, and the side-portion heating unit H1, an upper-portion heating unit H2, and a lower-portion heating unit H3 which are multiple heating units for heating the tire mold M. The side-portion heating unit H1 out of these heating units corresponds to a mold heating device according to the present invention.

(Regarding Tire Mold)

The tire mold M is a steel mold for accommodating a green tire T, and includes an upper mold M1 to come in contact with an upper surface of the tire T, a lower mold M2 to come in contact with a lower surface of the tire T, a side mold M3 to come in contact with an outer circumferential surface of the tire T, and a container ring M4 for supporting the side mold M3 from the outer circumferential side.

The side mold M3 is divided into multiple segments (divided into 7 to 9 segments, for example) arranged in the circumferential direction, namely a circumferential direction about a center axis C of the tire T, and each of the segments is provided so as to move in the radial direction with respect to the upper mold M1. A pattern of protrusions and recesses is formed on an inner circumferential surface of the side mold M3 which is a surface facing the inside in the radial direction (a surface abutting against the tire). An outer circumferential surface of the side mold M3 which is a surface facing the outside in the radial direction includes a sloped surface which extends more radially outward at its lower side.

The container ring M4 has a cylindrical shape and is provided radially outside the side mold M3. The inner circumferential surface of the container ring M4, which is a surface facing radially inside, includes a sloped surface Ma which extends more radially outwards at its lower side, and this sloped surface Ma engages with the sloped surface contained in the outer circumferential surface of the side mold M3. The side mold M3 can move along the sloped surface Ma with respect to the container ring M4 while this engagement is maintained.

The container ring M4 is fixed to the upper platen 3 such that the upper-portion heating unit H2 is held between the container ring M4 and a lower surface of the upper platen 3. The upper platen 3 is fixed to an upper member 4 provided so as to vertically move with respect to the base plate 101. An annular hole Mb is formed in the container ring M4 so as to pass through the container ring M4 in the circumferential direction of the tire mold M. This annular hole Mb permits circulation of vapor for heating the tire mold M. The tire mold M thus can be heated by the vapor circulating through the annular hole Mb, in addition to the heating by the heating units H1-H3 described later. A form without the annular hole Mb may be employed as a mold heated by the mold heating device according to the present invention. In other words, the mold may be heated only by the heating units H1-H3.

The upper mold M1 and the side mold M3 are coupled to a hydrostatic pressure cylinder (not shown) via an upper plate 5 and an adaptor 6. This hydrostatic cylinder acts to vertically move the upper mold M1 and the side mold M3 with respect to the upper platen 3. On the other hand, the lower platen 7 is fixed on the base plate 101, and a lower mold M2 is fixed to the lower platen 7 via the lower-portion heating unit H3.

In this device, the side mold M3 opens when the upper member 4 moves up along with the container ring M4 and the hydrostatic cylinder simultaneously moves down the upper mold M1. A space is then formed between the upper mold M1 and the lower mold M2 when the upper member 4 and the upper mold M1 moves up, and a tire accommodation space a surrounded by these molds M1-M3 is opened. Moreover, while the container ring M4, the upper mold M1, and the side mold M3 are raised with respect to the lower mold M2, the hydrostatic cylinder is activated to move down the upper mold M1 and the side mold M3 with respect to the container ring M4. Thereby, the side mold M3 is moved along the sloped portion of the container ring M4. In other words, each of the segments of the side mold M3 moves radially outward, thereby extending radially outward the tire accommodation space a surrounded by the side mold M3.

As shown in FIG. 1A, during tire vulcanization, a green tire T in a toroidal shape is disposed in the tire accommodation space a in the tire mold M of the tire heating device 100. This green tire T is heated while it is held from inside by a center mechanism 8. The center mechanism 8 is provided in an area ranging from a location below the tire heating device 100 to the inside of the tire mold M, and includes a bladder 8a that is a bag body made of rubber. The green tire T is heated while an outer surface of this bladder 8a is contacted with an inner surface of the green tire T.

(Regarding Mold Heating Device)

In the present embodiment, the side-portion heating unit H1, the upper-portion heating unit H2, and the lower-portion heating unit H3 heat the mold. The side-portion heating unit H1 is disposed radially outside the tire mold M, the upper-portion heating unit H2 is provided between the upper platen 3 and the tire mold M, and the lower-portion heating unit H3 is provided between the lower platen 7 and the tire mold M.

(Regarding Side-Portion Heating Unit)

A description will now be given of the side-portion heating unit H1 referring to FIGS. 2 to 6.

Figure 2:
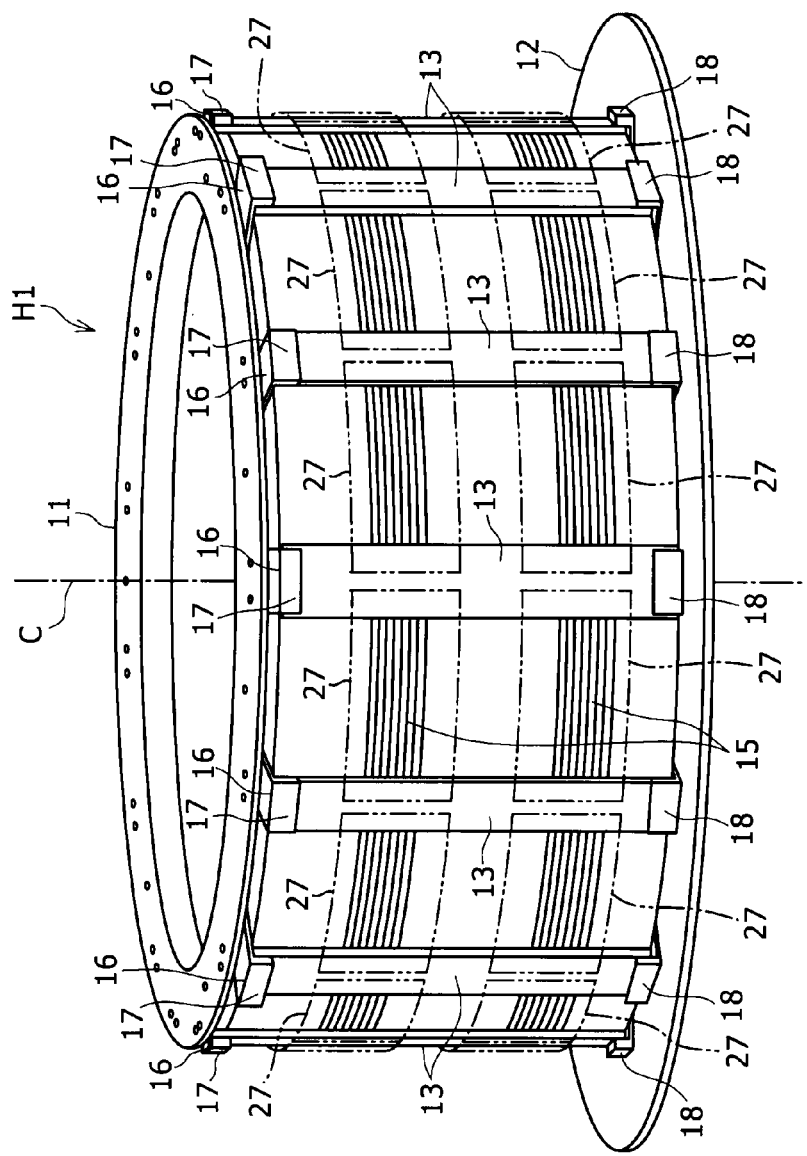
FIG. 2 is a perspective schematic view of a side-portion heating unit shown in FIG. 1.
Figure 4:
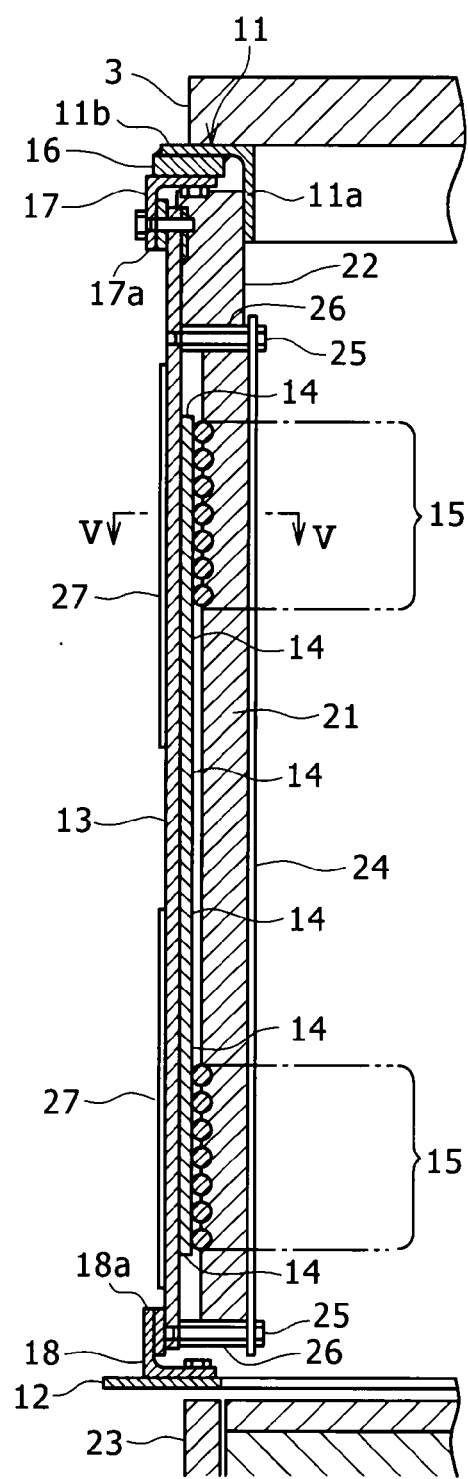
FIG. 4 is an enlarged cross sectional view of the side-portion heating unit shown in FIG. 1.
Figure 5:
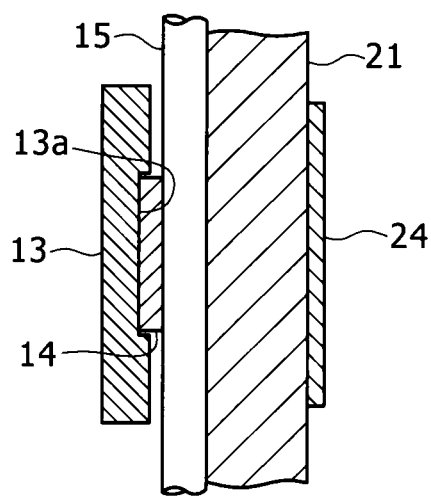
FIG. 5 is a cross sectional view taken from line V-V in FIG. 4.
Figure 6:
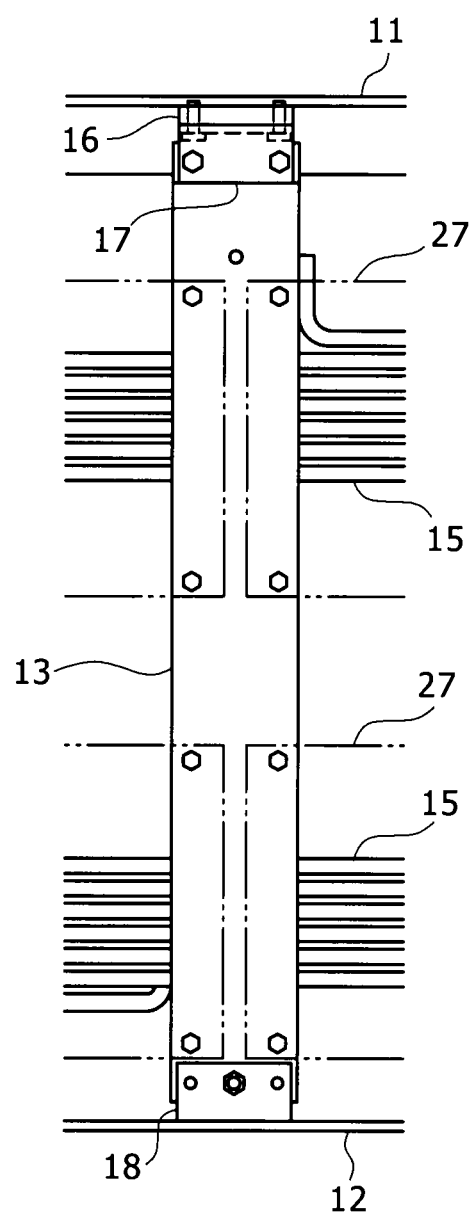
FIG. 6 is an enlarged side view of the side-portion heating unit viewed in a direction indicated by an arrow VI in FIG. 3.

FIG. 2 is a schematic perspective view of the side-portion heating unit H1 shown in FIG. 1. FIG. 3 is a plan view of the side-portion heating unit H1 shown in FIG. 1. FIG. 4 is an enlarged cross sectional view of the side-portion heating unit H1 in FIG. 1 (portion located on the left side with respect to the center axis C in FIG. 1). FIG. 5 is a cross sectional view taken from line V-V in FIG. 4, and a cover 27 described later is omitted in this figure. FIG. 6 is a view of the side-portion heating unit H1 shown in FIG. 3 seen in a direction indicated by an arrow VI.

As shown in FIGS. 2-6, the side-portion heating unit H1 includes an upper ring member 11 disposed above the tire mold M, a lower ring member 12 disposed below the tire mold M so as to oppose the upper ring member 11 along a specific direction (vertical direction in the figures), multiple non-magnetic members 13 (nonmagnetic members) for connecting the upper ring member 11 with the lower ring member 12, multiple ferromagnetic non-conductive members 14 (ferromagnetic non-conductive members), each of which is provided on an inside surface of each of the non-magnetic members 13, namely, a surface opposing the tire mold M, and coils 15 fixed to the surfaces of the ferromagnetic non-conductive members 14, which oppose to the tire mold M.

As shown in FIG. 4, the upper ring member 11 includes a cylindrical portion 11a having the internal diameter larger than the external diameter of the container ring M4, and a flange portion 11b extending radially outward from an upper end of the cylindrical portion 11a, and has a cross section in an L shape viewed in the circumferential direction. The upper ring member 11 is fixed to the upper platen 3 by bolts that pass through the flange portion 11b. The upper ring member 11 is preferably made of a material excellent in heat resistance, strength, and machining property such as a steel material. The upper ring member 11 and the lower ring member 12 are disposed so that the center axes thereof are concentric with the center axis C of the tire T disposed in the tire mold M. Both the ring members 11, 12 have ring-shape on planes (horizontal planes in the drawings) perpendicular to the specific direction, and have the inner diameters larger than the outer diameter of the container ring M4. The lower ring member 12 is preferably formed of a material applicable to the upper ring member 11 such as a steel material.

The non-magnetic members 13 vertically extend respectively, and are arranged between the upper ring member 11 and the lower ring member 12 at an approximately equal interval in the circumferential direction of both of the ring members 11, 12. In the present embodiment, a total of sixteen non-magnetic members 13 are arranged. The non-magnetic member 13 is formed of a nonmagnetic metal material such as aluminum, or a nonmagnetic material which is other than metal materials and excellent in heat resistance and strength (such as super engineering plastic). In the present embodiment, each interval between the adjacent non-magnetic members 13 is wider than the width of the non-magnetic members 13.

Each of the non-magnetic members 13 is coupled to the upper ring member 11 via an upper bracket 17, and is coupled to the lower ring member 12 via a lower bracket 18. More specifically, a plate member 16 is welded to a lower surface of the flange portion 11$b$ of the upper ring member 11 and the upper brackets 17 are fixed using bolts to the plate member 16 at positions corresponding to the arrangement of the non-magnetic members 13. Each of the upper brackets 17 includes a horizontal portion fixed to the plate member 16, and a portion 17$a$ extending approximately vertically downward from an outside edge of this horizontal portion. An upper end portion of the non-magnetic member 13 is fixed to this portion 17$a$, which extends downward, via a plate-shaped spacer using bolts. In other words, the non-magnetic member 13 is disposed so as to extend downward from the upper bracket 17. On the other hand, each of the lower brackets 18 includes a horizontal portion fixed to an upper surface of the lower ring member 12, and a portion 18$a$ extending approximately vertically upward from an outside edge of this horizontal portion. A lower end portion of each of the non-magnetic members 13 is fixed to this portion 18$a$, which extends upward, via a plate-shaped spacer using bolts.

Each of the ferromagnetic non-conductive members 14 is formed of a ferromagnetic non-conductive member such as ferrite, extends vertically as each of the non-magnetic members 13, and is fixed to an inside surface of the non-magnetic member 13, namely a surface facing the tire mold side. Specifically, a groove 13$a$ extending in the lengthwise direction of the non-magnetic member 13, namely vertically, is provided on the inside surface of each of the non-magnetic member 13, and the ferromagnetic non-conductive members 14 are fixed along the groove 13$a$. As shown in FIG. 4, on the inside surface of each of the non-magnetic members 13, the ferromagnetic non-conductive members 14 are disposed over multiple stages (six stages in the present embodiment), which are arranged in the vertical direction, with gaps in this direction scarcely left between the second plate members.

The coils 15 are made of Litz wires, for example. As shown in FIG. 4, the coils 15 are fixed to the inside of the non-magnetic member 13 in such a manner that the coils 15 are fixed to the inside surface of the ferromagnetic non-conductive members 14, namely, the surface facing the tire mold, using not-shown tie bands (for example, Insulok (registered trademark) or Ty-rap (registered trademark)) so that the coils 15 are disposed in a direction perpendicular to the lengthwise direction of the ferromagnetic non-conductive members 14 (namely, the coils 15 extend in the circumferential direction of the mold). As shown in FIG. 2, the wire constructing the coils 15 is wound along the inner surface of the ferromagnetic non-conductive members 14 and about an axis (vertical axis) parallel with the specific direction so as to surround the tire mold M from the lateral side of the tire mold M.

As shown in FIG. 4, the coils 15 according to this embodiment are disposed in an area close to the upper end portion of the arranged six ferromagnetic non-conductive members 14 and in an area close to the lower end portion thereof. In these areas, the wire (namely Litz wire) constructing the coil 15 is densely wound at an interval smaller than the diameter of the wire. On the other hand, the coil 15 is not provided in a vertically center portion of the arranged six ferromagnetic non-conductive members 14.

When the tire mold M is closed (state shown in FIG. 1), each of the annular holes Mb formed close to the outer circumferential surface of the container ring M4 opposes the vertically center area of the arranged six ferromagnetic non-conductive members 14, namely, the intermediate area on which the coil 15 is not wound. In other words, in the intermediate area, a thin portion exists outside the annular hole Mb, and the coil 15 is not provided in this area.

This device further includes a heat insulation material 21. As shown in FIGS. 4 and 5, this heat insulation material 21 is located radially inside the coils 15, and is arranged in the vertical direction, which is the specific direction, so as to entirely cover from a position of the uppermost coil 15 to a position of the lowest coil 15. The heat insulation material 21 is formed of a member having flexibility and being mattress-shaped, and has a cylindrical shape. The heat insulation material 21 is formed of a fiber material represented by glass wool, rock wool or the like.

This heat insulation material 21 is held with respect to the inside surface of the non-magnetic member 13 by a bracket 24, which is a holding member. The bracket 24 is formed of a non-metal material such as epoxy resin or nylon resin, and has a rectangular shape. As shown in FIG. 4, the bracket 24 is fixed with bolts 25 to a portion of the non-magnetic member 13, which is close to its upper end, and a portion thereof, which is close to its lower end, so that the heat insulation material 21 is clamped between the bracket 24 and the non-magnetic member 13.

A spacer 26 for maintaining a predetermined interval between the non-magnetic member 13 and the bracket 24 is provided around the axis of the bolt 25. The axial length of this spacer 26 determines an interval between the bracket 24 and the coil 15 when the bolt 25 is fully tightened. As a result, by fully tightening the bolts 25, a force clamping the heat insulation material 21 is adjusted to a proper force, and, simultaneously, a gap of a proper dimension is easily and surely secured between the heat insulation material 21 and the container ring M4.

A cylindrical heat insulation material 22 is provided above the heat insulation material 21. The cylindrical heat insulation material 22 is provided so as to cover the upper-portion heating unit H2 from the lateral side, and an upper end portion of the cylindrical heat insulation material 22 is clamped between the cylindrical portion 11$a$ of the upper ring member 11 and the non-magnetic member 13. Moreover, a cylindrical heat insulation material 23 is provided below the heat insulation material 21 so as to cover the lower-portion heating unit H3 from the lateral side.

As shown by long dashed double-short dashed lines in FIG. 2, multiple covers 27 formed of a non-metal material (such as epoxy resin or nylon resin) are provided outside the non-magnetic members 13. Each of the covers 27 is provided in upper and lower stages so as to cover, from the radially outside, upper and lower portions on which the coils 15 are densely wound. Each cover 27 is provided at multiple positions arranged in the circumferential direction, more specifically positions across adjacent non-magnetic members 13 in the circumferential direction, and, as shown in FIG. 6, both end portions of each of the covers 27 are fixed to the non-magnetic members 13 using bolts. As a result, these covers 27 cooperate with the non-magnetic members 13 to cover the coils 15 along the entire circumference from outside. A space is secured between these covers 27 and the coils 15, and, simultaneously, upper and lower ends of the space are respectively opened so as to permit the air in the space to escape upward or downward.

(Regarding Upper-Portion Heating Unit and Lower-Portion Heating Unit)

As shown in FIG. 1, the upper-portion heating unit H2 and the lower-portion heating unit H3 are respectively provided to above and below the tire mold M. The upper-portion heating unit H2 includes a coil 31, a ferromagnetic metal member 32 provided between the coil 31 and the tire mold M, and a heat insulation material 33 provided between the coil 31 and the ferromagnetic metal member 32. The coil 31 is provided on a plane perpendicular to the center axis C of the tire mold M so as to form a spiral viewed in a direction parallel with the center axis C of the tire mold M. The lower-portion heating unit H3 includes a coil 34, a ferromagnetic metal member 35 provided between the coil 34 and the tire mold M, and a heat insulation material 36 provided between the coil 34 and the ferromagnetic metal member 35. The coil 34 is provided on a plane perpendicular to the center axis C of the tire mold M so as to form a spiral viewed in the direction parallel with the center axis C of the tire mold M. The ferromagnetic metal members 32, 35 are formed of a steel material, for example.

(Regarding Method of Heating Tire)

When the tire is heated, the tire mold M is opened, the green tire T is provided at the center of the mold, and the center mechanism 8 is activated so that the bladder 8a of the center mechanism 8 is contacted with the inner surface of the green tire T. The tire mold M is then closed, and the green tire T is heated from its inner surface side and its outer surface side simultaneously.

The green tire T is heated from its inner surface side by introducing a heating fluid at a high temperature and a high pressure into the bladder 8a in the center mechanism 8. The center mechanism 8 includes a pipe. Thorough this pipe, the heating fluid at the high temperature and the high pressure is introduced into the bladder 8a. As a result of this, the bladder 8a extends, and the outer surface thereof comes in close contact with the inner surface of the green tire T, and heat of the heating fluid is transmitted to the green tire T via the bladder 8a.

The green tire T is heated from its outer surface side by heating the tire mold M. Specifically, high frequency current is made to flow through the coils 15 surrounding the side surface of the tire mold M, and the high frequency current forms lines of magnetic force in the neighborhood of the coils 15. The lines of magnetic force concentrate on the ferromagnetic non-conductive members 14 disposed outside the coils 15 and having a high magnetic permeability, and on the tire mold M disposed inside the coils 15 and made of steel. As a result of this, eddy currents high in density are generated in the tire mold M. Joule heating (resistance heating) by the eddy currents and a hysteresis loss caused by alternating magnetic field generated by the high frequency heat a part of the tire mold M, which is an outer surface thereof close to the coils 15. Since the ferromagnetic non-conductive members 14 having high magnetic permeability are disposed outside the coils 15, magnetic flux concentrates on the opposite side of the tire mold M with respect to the coils 15, specifically, on the radial outside of the coils 15. Thus, heating efficiency is increased. Further, the ferromagnetic non-conductive members 14 also prevent the lines of magnetic force from leaking to the outside. When a part of the tire mold M, which is close to the outer surface thereof, is heated in this way, the heat passes through the tire mold M and is applied to the green tire T provided in the tire mold M.

On the other hand, while the high frequency currents is made to flow through the coils 15, high frequency current is made to flow through the coils 31, 34 of the upper-portion heating unit H2 and the lower-portion heating unit H3. Thereby, induction heating is performed for the ferromagnetic metal members 32, 35. Heat generated there is transferred via the tire mold M to the green tire T, thereby heating the green tire T.

The heating of the green tire T from the outside by the side-portion heating unit H1, the upper-portion heating unit H2, and the lower-portion heating unit H3 may be always carried out independently of the opening/closing of the mold by the tire heating device 100.

A temperature sensor, which is not shown, is provided on an outer circumferential portion of the tire mold M, and a detection signal output from this temperature sensor is input to a temperature controller. The temperature controller outputs a signal for controlling an output of a high frequency power supply when the temperature detected by the temperature sensor reaches a predetermined temperature, thereby performing temperature control so as to maintain the tire mold M to a constant temperature. If the upper-portion heating unit H2 and the lower-portion heating unit H3 are also used for the heating as in the present embodiment, temperature sensors may respectively be provided at the upper end and the lower end of the tire mold M, and the output of the high frequency power supply may be controlled to maintain the temperature of the tire mold M to be constant based on the temperatures detected by these temperature sensors.

If the size of the green tire T to be vulcanized is changed, the tire mold M also has to be changed, but the side-portion heating unit H1, the upper-portion heating unit H2 and the lower-portion heating unit H3, which constitute the mold heating device, do not have to be changed. The size of the green tire T can be easily changed only by replacing the tire mold M.

(Regarding Effects of Present Embodiment)

(1) As described above, in the side-portion heating unit H1 (mold heating device) according to the present embodiment, the upper ring member 11 and the lower ring member 12, which are a pair of ring members, oppose each other along the specific direction and across the space, in which the tire mold M is disposed, and the non-magnetic first plate members 13, which are nonmagnetic members, are respectively provided at the multiple locations (16 in the present embodiment) arranged in the circumferential direction of the upper ring member 11 and the lower ring member 12, thereby coupling the upper ring member 11 to the lower ring member 12. The ferromagnetic non-conductive second plate members 14, which are ferromagnetic non-conductive members, are provided on the inside surfaces of the non-magnetic members 13, namely on the surfaces facing the center axis C of the ring members 11, 12, and the non-magnetic members 13 support the coils 15 via this ferromagnetic non-conductive members 14 so that the coils 15 surround the space, in which the tire mold M is disposed, from the lateral side. Therefore, compared with a device including a single cylinder, which covers the entire circumference of the tire mold M, as a nonmagnetic member for supporting the coils, the non-magnetic members 13 can be easily arranged around the tire mold, the coils 15 can be easily provided inside the nonmagnetic members, and the manufacturing cost thereof is thus low. An inexpensive mold heating device is thus provided. Particularly in the present embodiment, each of the non-magnetic members 13, which are nonmagnetic members for supporting the coils 15, has the oblong plate shape, the formation thereof is extremely easy, and effect of reducing the manufacturing cost is large. This effect is not limited to the case in which the non-magnetic member 13 is in the plate shape, and can also be obtained if the non-magnetic member 13 is in a square bar shape or a cylindrical shape.

Specifically, the device according to the present embodiment can easily be installed by assembling the upper ring member 11, the lower ring member 12, and the multiple non-magnetic members 13 in advance, winding the coils 15 after the multiple non-magnetic members 13 are arrange in the cylindrical shape, thereafter fitting the heat insulation material 21, and fixing the heat insulation material 21 by the nonmetallic brackets 24.

Moreover, since the non-magnetic members 13 are respectively provided at the multiple locations, which are mutually spaced, in the circumferential direction of both the ring members 11, 12, a required quantity of the nonmagnetic material is smaller than a case in which a nonmagnetic member for supporting the coils has a cylindrical shape so as to cover the entire circumference of the tire mold M. This also contributes to provision of a more inexpensive mold heating device.

Moreover, since the upper and lower ends of each of the non-magnetic members 13 are respectively fixed to the upper ring member 11 and the lower ring member 12, both of which are made of the highly strong and inexpensive steel, collapse of relative relationship in position among the non-magnetic members 13 is thus prevented. Therefore, deformation of the coils 15 fixed to the multiple non-magnetic members 13 is surely prevented by the inexpensive configuration.

(2) The coils 15 are provided only in the intermediate area along a direction, along which the upper ring member 11 and the lower ring member 12 oppose each other (vertical direction). In this intermediate area, the annular hole Mb for the circulation of the heated vapor, which heats the mold, is formed through the tire mold M. The coils 15 are not wound at the position opposing the annular hole Mb but wound only at the position opposing the mold above and below the annular hole Mb. Thus, the temperature distribution of the tire mold M heated by induction using the coils 15 can be made close to uniform. Since the thin portion exists outside the annular hole Mb and has a small heat capacity, the temperature of the thin mold portion would rapidly increase if the thin portion is heated by induction. In the side-portion heating unit H1, however, the coils 15 are not wound on the position opposing the thin portion, and the rapidly and locally-increased temperature of the mold is thus restrained.

This effect is not limited to the case in which the coil is not wound at all at the position opposing the annular hole Mb, but is obtained in a case in which the intervals between the wires constructing the coil 15 are wider in the intermediate area along a direction, along which the upper ring member 11 and the lower ring member 12 oppose each other (vertical direction), than in both the upper and lower areas along the direction. For example, the coil may be wound so that the position opposing the annular hole Mb has wider intervals between wires of the coil than the positions above and below this position.

(3) In the side-portion heating unit H1, the heat insulation material 21 is provided so as to cover the space, in which the tire mold M is provided, from the lateral side, the brackets 24 serving as the holding member made of the non-metal material is fixed to the non-magnetic members 13 so that the heat insulation material 21 is held between the bracket 24 and the coils 15. Thus, since the heat insulation material 21 restrains the heat emission from the heated tire mold M to the outside, the energy consumption, when the tire is heated, can be reduced. Particularly since the heat insulation material 21 has a tubular shape and is arranged so as to cover the entire circumference of the tire mold M without leaving gaps, the heat emission can be remarkably restrained. In addition, the bracket 24 prevents the heat insulation material 21 from deforming toward the inside, and it is thus not necessary to construct the heat insulation material 21 using a material particularly high in rigidity. The heat insulation material 21 can thus be formed of the inexpensive fiber material in a mattress shape that is high in heat insulation effect as described before.

Though the description has been given of the embodiment of the present invention, the present invention is not limited to the above embodiment, and can be modified and embodied in various ways within the scope of Claims.

As described above, the present invention provides a mold heating device for heating a tire mold, in which a tire is accommodated, the device being inexpensive and easy to produce. This mold heating device includes: a pair of ring members opposing each other along a specific direction and across a space, in which the tire mold is disposed, and having ring-shape on planes perpendicular to the specific direction; a plurality of nonmagnetic members arranged at intervals at a plurality of positions arranged in the circumferential direction of the pair of ring members, and coupling both the ring members to each other; a ferromagnetic non-conductive member provided on the inside surface of each of these nonmagnetic members, the surface facing the tire mold; and a coil supported by the plurality of nonmagnetic members via the ferromagnetic non-conductive members so as to surround the space, in which the tire mold is disposed, from the outside of the direction perpendicular to the specific direction.

In this device, since the nonmagnetic members holding the coils are respectively provided at intervals at a plurality of positions arranged in the circumferential direction of the pair of ring members, the nonmagnetic members can be easily provided around the tire mold and are easy to produce and low in manufacturing cost, compared with a device including a nonmagnetic member formed as a single cylinder covering the entire circumference of the tire mold. Inexpensive mold heating devices are thus provided. Moreover, since the ferromagnetic non-conductive member is provided on the inside surface of each of the nonmagnetic members arranged in the circumferential direction of the ring members, the nonmagnetic members can support from the outer circumferential side the coils via the ferromagnetic non-conductive members. Thus, the installation of the coils, and, further, the production of the mold heating device can be facilitated.

It is preferable that the coil is constructed by a wire wound about an axis parallel with the specific direction, and an interval between the wires adjacent to each other is wider in an intermediate area along the specific direction than in both end areas along the specific direction. This form is preferred for cases where a thin portion exists in the outer circumferential portion of the intermediate area along the specific direction of the mold to be heated, such as a case where an annular hole, through which the heating vapor passes, is provided in the outer circumferential portion, for example. In the intermediate area of the mold where such a thin portion exists, locally-increased temperature in the thin portion is effectively restrained by securing wide interval of the wires of the coils in the mold heating device according to the present invention. In addition, the coils may be arranged only in both the end areas located on the both sides of the intermediate area.

It is preferable that the mold heating device according to the present invention further includes: a heat insulation material provided so as to cover the space, in which the tire mold is disposed, from the lateral side; and a holding member formed of a non-metal material, disposed inside the coil, and fixed to the nonmagnetic member so that the coil is held between the holding member and the nonmagnetic member. Although the nonmagnetic members are intermittently provided, the heat insulation material can restrain the heat emission from the heated tire mold to the outside. This reduces the energy consumption when the tire mold is heated. Moreover, since the holding members, which are made of the non-metal material and fixed to the inside of the nonmagnetic members, prevents the heat insulation material from deforming toward the inside, the heat insulation material does not have to be composed of materials particularly high in rigidity, and the heat insulation material can be thus formed of materials, which is high in heat insulation effect and inexpensive (such as a fiber material represented by glass wool and rock wool).

In addition, the heat insulation material can have a tubular shape covering the entire circumference of the tire mold, thereby further increasing the effect of restraining the heat emission.

INDUSTRIAL APPLICABILITY

The present invention can be used for heating a tire mold, in which a tire is accommodated.

The invention claimed is:

1. A mold heating device of a tire mold, in which a green tire is accommodated, comprising:
    a pair of ring members opposing each other along a specific direction and across a space, in which the tire mold having a ring-shape is disposed on planes perpendicular to the specific direction;
    nonmagnetic members arranged radially outside of the tire mold and at intervals at a plurality of positions arranged in the circumferential direction of said ring members, and coupling both said ring members to each other;
    a ferromagnetic non-conductive member provided on a surface of each of said nonmagnetic members, the surface facing the center axis side of said ring members; and
    a coil supported by said plurality of nonmagnetic members via said ferromagnetic non-conductive members so as to surround the space, in which the tire mold is disposed, from the outside of the direction perpendicular to the specific direction.

2. The mold heating device according to claim 1, wherein said coil is constructed by a wire wound about an axis parallel with the specific direction, and an interval between the wires adjacent to each other is wider in an intermediate area between the pair of ring members along the specific direction than in areas on either side of the intermediate area along the specific direction.

3. The mold heating device according to claim 2, wherein said coil is arranged only in both of the side areas along the specific direction.

4. The mold heating device according to claim 1, further comprising:
    a heat insulation material provided so as to cover the space, in which the tire mold is disposed, from the lateral side; and
    a holding member formed of a non-metal material, disposed inside said coil, and fixed to said nonmagnetic member so that said coil is held between said holding member and said nonmagnetic member.

5. The mold heating device according to claim 4, wherein said heat insulation material has a tubular shape covering the entire circumference of the tire mold.

* * * * *